March 21, 1933.      E. C. STANLEY      1,902,592
OILING SYSTEM FOR MOTOR CARS
Original Filed Feb. 10, 1926
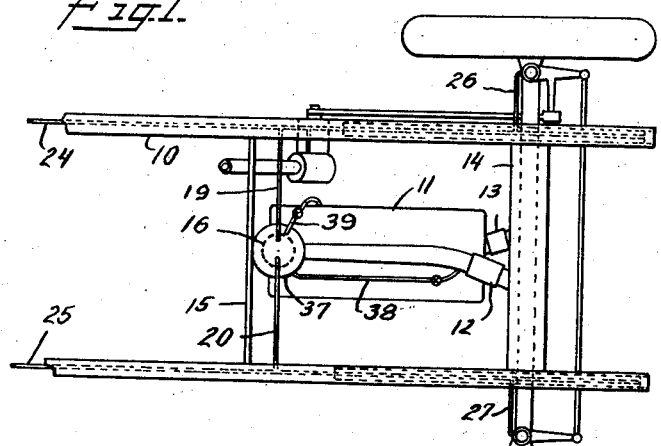
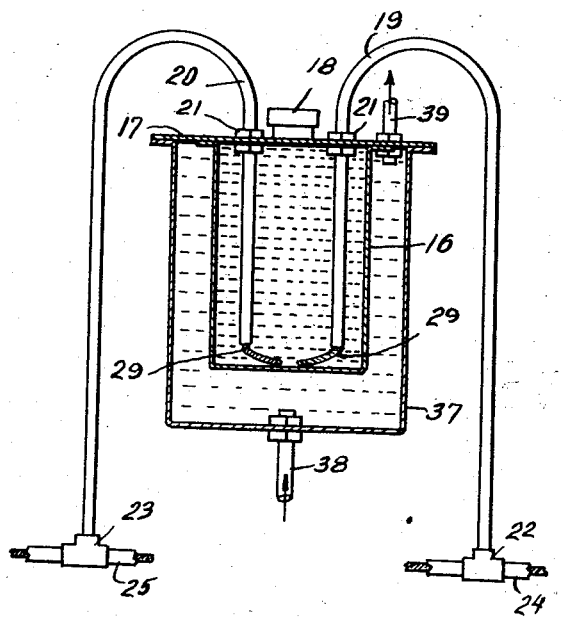
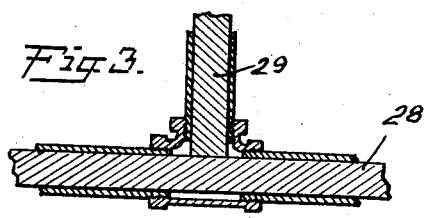
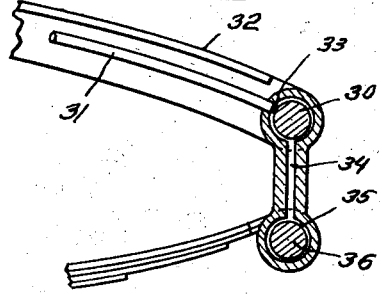
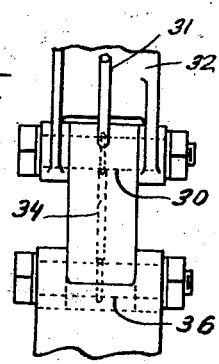
INVENTOR
Edgar C. Stanley
BY
Pennie, Davis, Marvin & Edmonds
HIS ATTORNEYS Patented Mar. 21, 1933

1,902,592

UNITED STATES PATENT OFFICE

EDGAR CLARK STANLEY, OF GLEN COVE, NEW YORK, ASSIGNOR, BY MESNE ASSIGNMENTS, TO MOTOR AND PLANE ACCESSORIES, INC., OF DETROIT, MICHIGAN, A CORPORATION OF DELAWARE

OILING SYSTEM FOR MOTOR CARS

Application filed February 10, 1926, Serial No. 87,246. Renewed August 11, 1932.

This invention relates to lubricating systems, and has to do more particularly with a system which is especially adapted for use in a motor car.

In the modern motor car there are many parts on the chassis which, because of their relative movement when the car is in operation, require continual lubrication, and heretofore the oiling or other lubrication of these parts has been accomplished by the use of oil or grease cups which require constant replenishment. These cups are placed so as to discharge the lubricant to the surfaces of the parts where relative movement takes place, and in many instances the cups are disposed at points where they are accessible only with difficulty. It is consequently a laborious operation to keep the cups filled with the lubricant, and owing to the large number ordinarily required, frequently one or more cups may be overlooked or will run dry unnoticed, and this results in rubbing or wearing of the parts and in making the car noisy.

Attempts have been made to solve this difficulty by the installation on the motor car of piping or conduit systems connected with a central reservoir and leading to the different points at which lubrication is required. In some of these systems the distribution of the oil or other lubricant is accomplished by means of a pump of suitable form, which is brought into operation whenever required by the car driver. These systems are quite convenient and the oiling of the different moving parts may be accomplished without great difficulty, but as they require frequent manipulation by the attendant or driver, whenever this action is neglected the same difficulties due to lack of lubrication may arise and some wear may occur before the condition is noticed.

The present invention is directed to the provision of an oiling system for use in motor cars which is entirely automatic in operation, which is brought into action to supply lubricant to the parts which require it whenever the car is running, and which automatically stops the delivery of the lubricant when the car is at rest. In this system a central reservoir or receptacle of lubricant is provided, from which extend mains or conduits leading to the different points or surfaces where a supply of lubricant is necessary. The central reservoir is capable of being tightly sealed and is placed beneath the hood of the car, so that it will be exposed to the heat developed by the motor when the latter is in operation. The conduits are also oil-tight, and within these conduits is placed a material, such as a fibrous strand, which extends from one end to the other of the conduits. At the points where the lubricant is to be discharged, this strand may contact with the surface to be lubricated.

In the operation of the system, a quantity of oil is placed in the main reservoir, and the latter is then sealed. The main conduits are connected to the reservoir by a siphon tube within which the fibrous material lies, and the lubricant wets the fibrous material and is carried through it by capillary action. Upon operation of the motor, heat is transferred to the contents of the tank and the lubricant and the air trapped in the tank above the lubricant expand and pressure is created. This pressure assists the capillary attraction in causing the flow of the lubricant through the strand and eventually the entire strand is wet with the lubricant which begins to flow out through the end of the strand upon the surface to be lubricated. This action continues so long as the car is in operation. When the motor is stopped and cools off, the lubricant and air within the reservoir cool and contract, thus creating a slight vacuum within the reservoir which serves to draw back the lubricant through the strand away from the delivery point. The flow of the lubricant through the strand is thus prevented, and no flow, or else flow to a much lessened degree, occurs while the motor is at rest. The system is consequently automatic in operation, and the only attention required is the occasional replenishment of the lubricant in the reservoir. The lubricant is discharged only when required during the operation of the car and the flow is cut off when the car is not being used.

For a better understanding of the present invention, reference will be made to the accompanying drawing, in which Fig. 1 is a plan view, largely diagrammatic, of a portion of a motor car chassis, showing the installation of parts of the present system, Fig. 2 is a vertical sectional view through the main oil receptacle, Fig. 3 is a sectional view through the junction of a main line of the system to a branch, Fig. 4 is a view in elevation of a spring shackle, illustrating the manner of supplying lubricant thereto, and Fig. 5 is an end view of the parts illustrated in Fig. 4.

Referring now to the drawing, the motor car is illustrated conventionally and to a large extent diagrammatically, in Fig. 1. This car is shown as having a chassis formed in the usual way of side channel members 10, which are connected by cross members, not shown. In the front end of the car, under the hood, is disposed the motor 11, the cylinders of which are provided with water jackets connected by circulating pipes 12 and 13 to a radiator 14. At the rear end of the hood is a dash 15, and on this dash, beneath the hood, at any convenient point, is mounted the main oil reservoir, 16.

This reservoir or pressure tank is of any convenient form, but is preferably made of metal and is provided with a cover 17 secured to the receptacle in any convenient manner, so as to seal the latter. In this cover is a filling opening 18, which may be tightly closed by means of a plug. Extending through the cover are tubes 19 and 20, the inner ends of which terminate close to the bottom of the receptacle. These tubes extend through appropriate openings in the cover and are secured in position by nuts 21 in the usual way. The tubes 19 and 20 are siphon-shaped types, and are bent around the edge of the cover and extend downwardly, being connected to tees 22, 23, at their lower ends, forming parts of main conduits 24 and 25. These main conduits are secured to the frame of the car in any convenient manner, and extend throughout the length of the latter. The conduits and the tubes 19 are formed of metal, and are preferably copper tubes of a relatively small bore. The main conduits 24 and 25 are connected to numerous branch conduits, as, for instance, those designated 26 and 27, leading to the steering knuckles, and similar branch lines lead from the main conduits to other points where lubrication is required.

The tubes 19 and 20, the main conduits, and the branch lines contain a strand or filament 28, preferably of fibrous material, and these strands extend beyond the inner ends of the tubes 19 and 20, as at 29, 29, lying on the lower end of the receptacle. Numerous materials are suitable for use as the strand or wick, as, for instance, asbestos rope, or cotton gauze fabric, commonly known as bandage material, which may be rolled into a long strand and drawn through the tubes and conduits in any convenient way. The purpose of this strand or wick is to provide a conductor or medium through which the oil may flow by capillary attraction, and various material similar to those mentioned will be recognized as suitable for the purpose. The strand should substantially fill the tube in which it is placed, and it is preferably loosely matted together.

For convenience, the strands in the tubes 19 and 20 may extend only from the interior of the receptacle to the tees 22 and 23, where the strands designated 29 contact with the main strand 28, extending through the conduits. A similar construction is used in the branch lines. Each branch contains a strand, the end of which rests upon the main strand 26.

The branch lines which are connected in an oil-tight manner with the conduits, extend to the points at which the oil is to be delivered, as, for instance, to the shackle bolt 30, illustrated in Fig. 4. Here the branch line 31 leads along the frame extension 32 to an opening 33 drilled in the bolt housing. The shackle may similarly be drilled lengthwise, as at 34. The strand within the tube 31 extends beyond the end of the tube so as to bear against the surface of the bolt 30, and the passage 34 connects the inner face of the bearing in which the bolt rests with the bearing 35, in which the lower bolt 36 lies. A similar construction is used at the other places on the chassis where oil is to be delivered, the filament preferably extending out of the tube a slight distance and lying in contact with the surface over which the oil is to be distributed.

With the arrangement illustrated, a quantity of oil is introduced into the receptacle and when the motor is started it develops heat which causes the oil and air within the receptacle to expand. Since the receptacle is sealed this develops a pressure on the oil which forces it upwardly through the tubes 19 and 20, the heat decreasing the viscosity of the oil. The oil is thus caused to flow through the strand in part due to the action of the pressure, and in part by capillary attraction. The oil tank is preferably mounted on the dash above the main conduits so that gravity assists the flow of oil. The heat developed by the motor produces a pressure which continues so long as the motor is operating and the pressure causes the oil to flow out through the fibrous conductor to the surfaces to be lubricated. The strand controls the rate of flow and also serves as a storage medium for oil within the conduit. The delivery of oil is slow and is to some extent dependent on the rate at which the drop of oil at the end of the conduit is removed by relative movement of the bearing surface and the end of the conduit. When the car is stopped and the motor cools, the temperature of the oil and air in the receptacle similarly drops. The oil and air contract in volume and since some of the oil has been taken from the tank, a slight vacuum is created. This tends to draw oil back through the conduits into the tank. Air also tends to flow back through the conduit into the tank and eventually through leakage or by reason of the return flow of air, the vacuum is broken. A certain amount of oil clings to the strands of the conductor in the piping so that the strands remain moist with oil. When the motor is again started and heat generated, pressure is developed in the tank forcing the oil outward again, but since oil has been retained by the strands, the delivery of oil to the bearings is not delayed until oil can flow the entire length of the piping from the tank to any bearing since some of the oil in the strand is forced onward and replaced by oil from the tank. I have found that with this system, when the car has been in operation for a time and the motor is then stopped, oil is withdrawn from the lines backward to the tank so that the ends of the strands in contact with the surfaces to be lubricated are moist but not as wet as they are in normal operation. Consequently, leakage of oil is prevented and such leakage is also prevented by reason of the fact that the tank is sealed and when the system is not operating, there is no pressure in the tank which would tend to force oil out of it.

The system, it will be observed, is therefore largely automatic in operation. The receptacle is replenished with oil from time to time, but so long as a sufficient quantity of oil is present to cover the ends of the tubes 19 and 20, the system will operate satisfactorily and the oil is used at a very slow rate so that frequent replenishment is not required.

The system as above described is satisfactory for ordinary conditions, but where the car is to be used during the winter or in low temperatures, it would be necessary to use an oil of very light body in order to insure its proper distribution. In order to avoid any difficulties that might arise for these reasons, I prefer to enclose the receptacle within a metal jacket 37 which is connected through pipes 38 and 39 in the water circulating system. In the winter hot water coming from the water jackets of the motor passes through the chamber 37 on its way to the radiator, and thus the oil within the receptacle is rapidly raised to the desired temperature. With this water-jacketed receptacle it is possible to make use of a medium body oil under all conditions and the system comes into operation quickly as soon as the motor warms up. I provide suitable valves in the pipes 38 and 39, so that the flow of water through the water jacket is prevented in summer or when the atmospheric temperature is comparatively high.

The present system is superior to the systems now in use, because oil is distributed to all parts of the chassis where lubrication is required, without any attention on the part of the operator. So long as a supply of oil is present in the main reservoir, the starting of the car will bring about the distribution of the oil throughout the piping system. Owing to the presence of the strands or wick within the tubing, the system may be said to be practically dry because only a small quantity of oil is present in the piping and in this respect the present system is entirely different from similar systems in which oil is distributed by means of a pump operated by the driver. Accordingly, if one of the pipes of the present system, becomes damaged or broken, no considerable quantity of oil will escape and so long as the strands are in contact breakage of any pipe is not serious because the oil would be conducted through the strands by the capillary action. In the pump-operated systems, the operator is required not only to replenish the main reservoir from time to time, but also the distribution of the oil through the system requires occasional attention on the part of the operator. The present system merely requires replenishment of the oil in the main reservoir, and so long as the supply of oil is available the starting of the car engine will automatically bring about a distribution of oil, and this distribution will be cut off as soon as the engine is stopped.

I claim:

1. An oiling system for use in conjunction with a prime mover comprising a sealed receptacle to contain oil, the receptacle being so mounted as to be exposed to heat applied during the operation of the prime mover, a conduit leading from below the surface of the oil in the receptacle to a point in proximity to an element to be lubricated, a wick within the conduit extending a substantial proportion of the length thereof, said system upon operation of the prime mover and the application of heat to the fluid within the receptacle causing oil to flow from the receptacle to the element and causing the flow of oil to cease upon the stopping of the prime mover and the cooling of the receptacle.

2. An oiling system for use in conjunction with a prime mover, comprising a sealed receptacle to contain oil and to be heated upon operation of the prime mover, a siphon-conduit leading from the receptacle to a point in proximity to an element to be lubricated, a wick within the conduit extending a substantial proportion of the length thereof, said system upon operation of the prime mover and the application of heat to the fluid within the receptacle causing oil to flow from the receptacle to the element and causing the flow of oil to cease upon the stopping of the prime mover and the cooling of the receptacle.

3. An oiling system for use in conjunction with a prime mover, comprising a sealed receptacle to contain oil, the receptacle having heat supplied thereto upon operation of the prime mover, a siphon-conduit leading from the receptacle to a point in proximity to an element to be lubricated, a wick within the conduit, said wick having substantially the same cross-sectional area as the conduit, and extending a substantial proportion of the length of said conduit, said system upon operation of the prime mover and the application of heat to the fluid within the receptacle causing oil to flow from the receptacle to the element and causing the flow of oil to cease upon the stopping of the prime mover and the cooling of the receptacle.

4. An oiling system for use in conjunction with a prime mover comprising a sealed receptacle to contain oil and to be heated upon operation of the prime mover, a siphon-conduit leading from the receptacle to a point in proximity to an element to be lubricated, a wick within the conduit and occupying substantially the entire effective volume thereof, said system upon operation of the prime mover and the application of heat to the fluid within the receptacle causing oil to flow from the receptacle to the element and causing the flow of oil to cease upon the stopping of the prime mover and the cooling of the receptacle.

5. An oiling system for use in conjunction with a prime mover comprising a sealed receptacle to contain oil and to be heated upon operation of the prime mover, a siphon-conduit leading from the receptacle to a point below the oil level, branch conduits connected to the siphon conduit and extending to points in proximity to elements to be lubricated, a wick within the siphon-conduit, and extending substantially throughout the length thereof, branch wicks within the branch conduits and contacting with the first mentioned wick, said system upon operation of the prime mover and the application of heat to the fluid within the receptacle causing oil to flow from the receptacle to the elements and causing the flow of oil to cease upon the stopping of the prime mover and the cooling of the receptacle.

6. An oiling system for use in a motor car, comprising the combination of a sealed receptacle mounted on the car beneath the motor hood and containing a quantity of oil a conduit leading from the receptacle to the points on the car which require lubrication, and a porous conductor lying within the conduit and substantially filling the latter, this conductor having a loose structure whereby oil may be transmitted through it, and the receptacle being mounted in such proximity to the motor that the fluid therein is heated and expanded by the heat developed by the motor when the latter is in operation, the expansion of the fluid producing pressure in the receptacle assisting the flow of oil to the conductor.

7. An oiling system for use in a motor car comprising the combination of a sealed receptacle mounted in proximity to the motor and containing a quantity of oil, a piping system mounted on the chassis and extending from a point in the receptacle below the normal oil level therein to points on the car which require lubrication, and a conductor of loosely compacted fibrous material extending through the piping system from one end to the other and substantially filling the piping, the receptacle being mounted in such relation to the motor that the fluid therein is heated and expanded by the heat developed by the motor when the latter is in operation to produce a pressure in the receptacle assisting the flow of oil through the conductor.

8. An oiling system for use in a motor car, comprising the combination of a sealed receptacle mounted beneath the hood of the motor and containing a quantity of oil a pair of tubes passing through the top of the receptacle and terminating below the lower end of the latter, the inner ends of these tubes lying close to the bottom of the receptacle, a pair of main conduits on either side of the frame members of the chassis and connected to the tubes, a plurality of branch lines leading from the main conduits to the points on the car which require lubrication, and conductors extending throughout the piping system consisting of the tubes, the conduits, and the branch lines, these conductors providing a medium through which the oil may flow, the receptacle being mounted on the car in such proximity to the motor that the fluid in the receptacle is heated and expanded by the heat developed by the motor when the latter is in operation, the expansion of the fluid producing pressure in the receptacle assisting the fluid of oil through the conductor.

9. An oiling system for use in a motor car, comprising the combination of a receptacle containing the lubricant, a conduit leading from the receptacle to the points on the car which require lubrication, a conductor lying within the conduit and extending from the receptacle to the said delivery points, and means for delivering heat to the lubricant within the receptacle effective when the motor is in operation, comprising a water jacket substantially enclosing the receptacle and connections from the water jacket to the water-circulating system of the car motor.

10. An oiling system for use in a motor car, comprising the combination of a closed receptacle adapted to contain a quantity of lubricant, a water jacket substantially enclosing this receptacle, connections to the water jacket by which the water jacket becomes a part of the water-circulating system of the motor of the car, a siphon tube through the wall of the receptacle having its inner end lying close to the bottom of the latter and beneath the normal lubricant level, a conduit connected to the other end of the tube extending along the chassis, branch lines leading from the conduit to the points at which the lubricant is to be delivered, and a conductor extending through the tube, the conduit, and the branch lines, the inner end of the conductor lying beyond the end of the tube and in contact with the lubricant, this conductor being formed of a loosely matted material and providing a medium through which the lubricant may flow by capillary attraction.

11. An oiling system for use in conjunction with a prime mover which comprises a sealed receptacle for oil placed in a position such that it is exposed to heat generated by the prime mover during operation thereof, a conduit leading from below the surface of the oil in the receptacle to a point above the said surface and then to a point below the oil level, and a line leading from the conduit to a point in proximity to an element to be lubricated, said system upon operation of the prime mover and the application of heat to the fluid within the receptacle, causing oil to flow from the receptacle to the element and causing the flow of oil to cease upon the stopping of the prime mover and the cooling of the fluid within the receptacle.

12. An oiling system for use in a motor car comprising the combination of a sealed receptacle for oil mounted on the car to be heated by heat generated by the motor in operation, and a conduit forming a siphon to siphon the oil from the receptacle to the points on the car which require lubrication, the receptacle upon operation of the motor, receiving heat causing the fluid therein to be expanded, such expansion producing pressure in the receptacle assisting in the flow of oil through the conduit.

13. An oiling system for use with a prime mover which comprises the combination of a sealed tank for containing oil and a quantity of air trapped above the oil, this tank being so placed as to be exposed to heat generated by the prime mover during operation thereof, a conduit leading from below the surface of the oil in the tank to a bearing requiring lubrication, and a fibrous conducting strand within the conduit and extending throughout a substantial proportion of the length thereof, the operation of the prime mover and the application of heat therefrom to the contents of the tank causing expansion of the contents and the generation of pressure, said pressure causing oil to be discharged from the tank to the conduit, the conductor in the conduit restricting the flow of oil and also retaining oil within the fibres thereof, the stoppage of the prime mover and the cooling of the tank causing a partial vacuum to be created therein due to the discharge of oil therefrom, said partial vacuum causing oil to be drawn back through the conduit toward the tank until said partial vacuum is broken.

14. An oiling system for use in a motor car comprising the combination of a sealed receptacle containing the lubricant, a siphon conduit leading from the receptacle and connected by lines to the points on the car which require lubrication, and means for delivering heat to the lubricant within the receptacle automatically becoming effective when the motor is put in operation and remaining effective throughout such operation.

15. An oiling system for use in a motor car comprising the combination of a sealed receptacle containing a lubricant, a conduit leading from the receptacle to the points on the car which require lubrication, a conductor within the conduit and extending from the receptacle for a substantial distance, and means for delivering heat to the lubricant within the receptacle automatically becoming effective when the motor is placed in operation and remaining effective throughout such operation, the said means including a jacket around the receptacle and means for circulating a fluid heated by reason of the motor operation through the jacket.

In testimony whereof I affix my signature.

EDGAR CLARK STANLEY.